(12) United States Patent
Asada et al.

(10) Patent No.: US 11,947,170 B2
(45) Date of Patent: Apr. 2, 2024

(54) CONNECTOR SYSTEM, OPTICAL CONNECTION METHOD, AND OPTICAL CONNECTION MEMBER

(71) Applicant: FUJIKURA LTD., Tokyo (JP)

(72) Inventors: Hirotaka Asada, Chiba (JP); Kansei Shindo, Chiba (JP); Kunihiko Fujiwara, Chiba (JP)

(73) Assignee: Fujikura Ltd., Tokyo (JP)

( * ) Notice: Subject to any disclaimer, the term of this patent is extended or adjusted under 35 U.S.C. 154(b) by 454 days.

(21) Appl. No.: 17/312,772

(22) PCT Filed: Oct. 2, 2019

(86) PCT No.: PCT/JP2019/038912
§ 371 (c)(1),
(2) Date: Jun. 10, 2021

(87) PCT Pub. No.: WO2020/137070
PCT Pub. Date: Jul. 2, 2020

(65) Prior Publication Data
US 2022/0050250 A1  Feb. 17, 2022

(30) Foreign Application Priority Data

Dec. 25, 2018  (JP) .................................. 2018-240880

(51) Int. Cl.
*G02B 6/38* (2006.01)
*G02B 6/04* (2006.01)
(Continued)

(52) U.S. Cl.
CPC ............. *G02B 6/3885* (2013.01); *G02B 6/04* (2013.01); *G02B 6/32* (2013.01); *G02B 6/3825* (2013.01); *G02B 6/3882* (2013.01); *G02B 6/403* (2013.01)

(58) Field of Classification Search
CPC .......... G02B 6/3885; G02B 6/04; G02B 6/32; G02B 6/3825; G02B 6/3882; G02B 6/403
(Continued)

(56) References Cited

U.S. PATENT DOCUMENTS

| 2003/0152326 A1* | 8/2003 | Morimoto ............ G02B 6/4201 385/140 |
| 2011/0026882 A1 | 2/2011 | Budd et al. |

(Continued)

FOREIGN PATENT DOCUMENTS

| CN | 105607161 A | 5/2016 |
| JP | 2003-66280 A | 3/2003 |

(Continued)

OTHER PUBLICATIONS

International Search Report issued in corresponding International Application No. PCT/JP2019/038912 dated Nov. 5, 2019 (3 pages).

*Primary Examiner* — Jerry M Blevins
(74) *Attorney, Agent, or Firm* — Osha Bergman Watanabe & Burton LLP (57) ABSTRACT

A connector system includes: a first ferrule configured to hold end parts of multi-core fibers; a second ferrule configured to hold end parts of single-core fibers; and an optical connection member. The optical connection member is arranged between the first and the second ferrule, and includes an optical system configured to optically connect respective cores included in the multi-core fibers and the single-core fibers. A guide pin is formed on one of the first and the second ferrule, and a guide hole is formed in another of the first and the second ferrule. A through hole is formed in the optical connection member, and the first ferrule, the optical connection member, and the second ferrule can be aligned by fitting the guide pin in the guide hole through the through hole.

7 Claims, 8 Drawing Sheets

(51) Int. Cl.
*G02B 6/32* (2006.01)
*G02B 6/40* (2006.01)

(58) Field of Classification Search
USPC .............................................. 385/78
See application file for complete search history.

(56) References Cited

U.S. PATENT DOCUMENTS

| | | |
|---|---|---|
| 2015/0063755 A1 | 3/2015 | Doany et al. |
| 2016/0139339 A1 | 5/2016 | Sasaki et al. |
| 2016/0231511 A1* | 8/2016 | Watanabe .......... G02B 6/02042 |
| 2016/0246015 A1* | 8/2016 | Case ................... G02B 6/4206 |
| 2017/0160491 A1 | 6/2017 | Zbinden |
| 2018/0335573 A1* | 11/2018 | Wada .................. G02B 6/3882 |
| 2019/0265417 A1 | 8/2019 | Nakama et al. |

FOREIGN PATENT DOCUMENTS

| | | |
|---|---|---|
| JP | 2003-232963 A | 8/2003 |
| JP | 2004-45646 A | 2/2004 |
| JP | 2013-057842 A | 3/2013 |
| JP | 2013-065002 A | 4/2013 |
| JP | 2013-076893 A | 4/2013 |
| JP | 6219288 B2 | 10/2017 |
| WO | 2013/031836 A1 | 3/2013 |
| WO | 2015/064635 A1 | 5/2015 |
| WO | 2018/101302 A1 | 6/2018 |
| WO | 2018/139184 A1 | 8/2018 |

\* cited by examiner

CONNECTOR SYSTEM, OPTICAL CONNECTION METHOD, AND OPTICAL CONNECTION MEMBER

TECHNICAL FIELD

The present invention relates to a connector system, an optical connection method, and an optical connection member.

BACKGROUND

A "multi-core fiber" including a plurality of cores in a fiber has been known. A transmission capacity can be increased by using the multi-core fiber as a transmission path. However, when the multi-core fiber is used as a transmission path, a fan-out technique for dividing an optical signal of each core into a plurality of fibers is needed. For example, Patent Literature 1 describes an optical connector for connecting a multi-core fiber and a single-mode fiber to each other.

PATENT LITERATURE

Patent Literature 1: JP 6219288B

In order to optically connect a multi-core fiber and a single-mode fiber to each other by using an optical connector (optical connection member) as described in Patent Literature 1, the multi-core fiber, the single-mode fiber (single-core fiber), and the optical connector (optical connection member) need to be aligned with high precision.

SUMMARY

One or more embodiments of the invention align a multi-core fiber, a single-core fiber, and an optical connection member with high precision with a simple configuration.

A connector system according to one or more embodiments of the invention comprises: a first ferrule configured to hold end parts of a plurality of multi-core fibers; a second ferrule configured to hold end parts of a plurality of single-core fibers; and an optical connection member arranged between the first ferrule and the second ferrule, and including an optical system configured to optically connect respective cores included in the multi-core fibers and the single-core fibers, wherein a guide pin is provided on one of the first ferrule and the second ferrule, and a guide hole is provided in another of the first ferrule and the second ferrule, a through hole is provided in the optical connection member, and the first ferrule, the optical connection member, and the second ferrule can be aligned by fitting the guide pin in the guide hole through the through hole.

Other features of the invention are made clear by the following description and the drawings.

Advantageous Effects of Invention

With one or more embodiments of the invention, it is possible to align a multi-core fiber, a single-core fiber, and an optical connection member with high precision with a simple configuration.

BRIEF DESCRIPTION OF DRAWINGS

FIGS. 3A and 3B are explanatory diagrams of an optical system of one unit.

DETAILED DESCRIPTION

At least the following matters are made clear from the following description and the drawings.

A connector system will become clear, comprising: a first ferrule configured to hold end parts of a plurality of multi-core fibers; a second ferrule configured to hold end parts of a plurality of single-core fibers; and an optical connection member arranged between the first ferrule and the second ferrule, and including an optical system configured to optically connect respective cores included in the multi-core fibers and the single-core fibers, wherein a guide pin is provided on one of the first ferrule and the second ferrule, and a guide hole is provided in another of the first ferrule and the second ferrule, a through hole is provided in the optical connection member, and the first ferrule, the optical connection member, and the second ferrule can be aligned by fitting the guide pin in the guide hole through the through hole. With this connector system, it is possible to align the multi-core fibers, the single-core fibers, and the optical connection member with high precision with a simple configuration.

In one or more embodiments, the optical connection member includes a first lens plate arranged on an end face of the first ferrule, a second lens plate arranged on an end face of the second ferrule, and a relay plate arranged between the first lens plate and the second lens plate, the first lens plate includes a plurality of first lenses corresponding to the multi-core fiber, the second lens plate includes a plurality of second lenses corresponding to the plurality of single-core fibers, the relay plate includes a plurality of first optical elements corresponding to the plurality of first lenses, and a plurality of second optical elements corresponding to the plurality of second lenses, the first lens is constituted such that collimated light propagates between the first lens and the first optical element, the second lens is constituted such that collimated light propagates between the second lens and the second optical element, and the first optical element and the second optical element are constituted such that an optical signal propagates between the first optical element and the second optical element. In this way, even when an arrangement (2×2 arrangement) of the cores of the multi-core fiber and an arrangement (1×4 arrangement) of the plurality of single-core fibers are different from each other, the multi-core fibers and the plurality of single-core fibers can be optically connected to each other with a simple configuration.

In one or more embodiments, the first lens plate includes a plurality of first end optical elements corresponding to the plurality of cores of the multi-core fiber, and the plurality of first end optical elements are constituted such that an interval between optical paths formed between the plurality of first end optical elements and the plurality of first lenses spreads further toward the relay plate side. In this way, an interference (crosstalk) between optical signals can be suppressed.

In one or more embodiments, when a direction parallel to central axes of the multi-core fibers is a front-rear direction, all of normal lines of a plurality of flat surfaces constituting the plurality of first end optical elements are inclined with respect to the front-rear direction. In this way, an influence of reflection of an optical signal by the first end optical element can be suppressed.

In one or more embodiments, when a direction in which the plurality of multi-core fibers held by the first ferrule are aligned is a width direction, the plurality of second optical elements corresponding to the multi-core fiber are arranged along a direction perpendicular to the width direction. In this way, the plurality of second optical elements can be arranged in a region being narrow in the width direction, and thus many fiber holes can be easily arranged in a predetermined region in the width direction of the connecting end face of the second ferrule.

In one or more embodiments, the collimated light propagating between the second lens and the second optical element is in a direction parallel to an axis direction of the guide pin. In this way, a signal loss can be suppressed.

An optical connection method will become clear, comprising: preparing a first ferrule configured to hold end parts of a plurality of multi-core fibers, a second ferrule configured to hold end parts of a plurality of single-core fibers, and an optical connection member having a through hole; arranging the optical connection member between the first ferrule and the second ferrule; a guide pin being located on one of the first ferrule and the second ferrule, and a guide hole being located in another of the first ferrule and the second ferrule, aligning the first ferrule, the optical connection member, and the second ferrule by fitting the guide pin in the guide hole through the through hole; and optically connecting respective cores included in the multi-core fibers and the single-core fibers via an optical system of the optical connection member. With this optical connection method, it is possible to align the multi-core fibers, the single-core fibers, and the optical connection member with high precision with a simple configuration.

An optical connection member will become clear, comprising: a first lens plate arranged on an end face of a first ferrule configured to hold end parts of a plurality of multi-core fibers, and including a plurality of first lenses corresponding to the multi-core fiber; a second lens plate arranged on an end face of a second ferrule configured to hold end parts of a plurality of single-core fibers, and including a plurality of second lenses corresponding to the plurality of single-core fibers; and a relay plate arranged between the first lens plate and the second lens plate, and configured to propagate an optical signal between the first lens and the second lens, wherein a pair of through holes are located in each of the first lens plate, the second lens plate, and the relay plate, and the first lens plate, the second lens plate, and the relay plate can be aligned with respect to the first ferrule and the second ferrule by fitting guide pins for aligning the first ferrule and the second ferrule in the through holes. With this optical connection member, it is possible to align the multi-core fibers, the single-core fibers, and the optical connection member with high precision with a simple configuration.

First Embodiment

Figure 1:
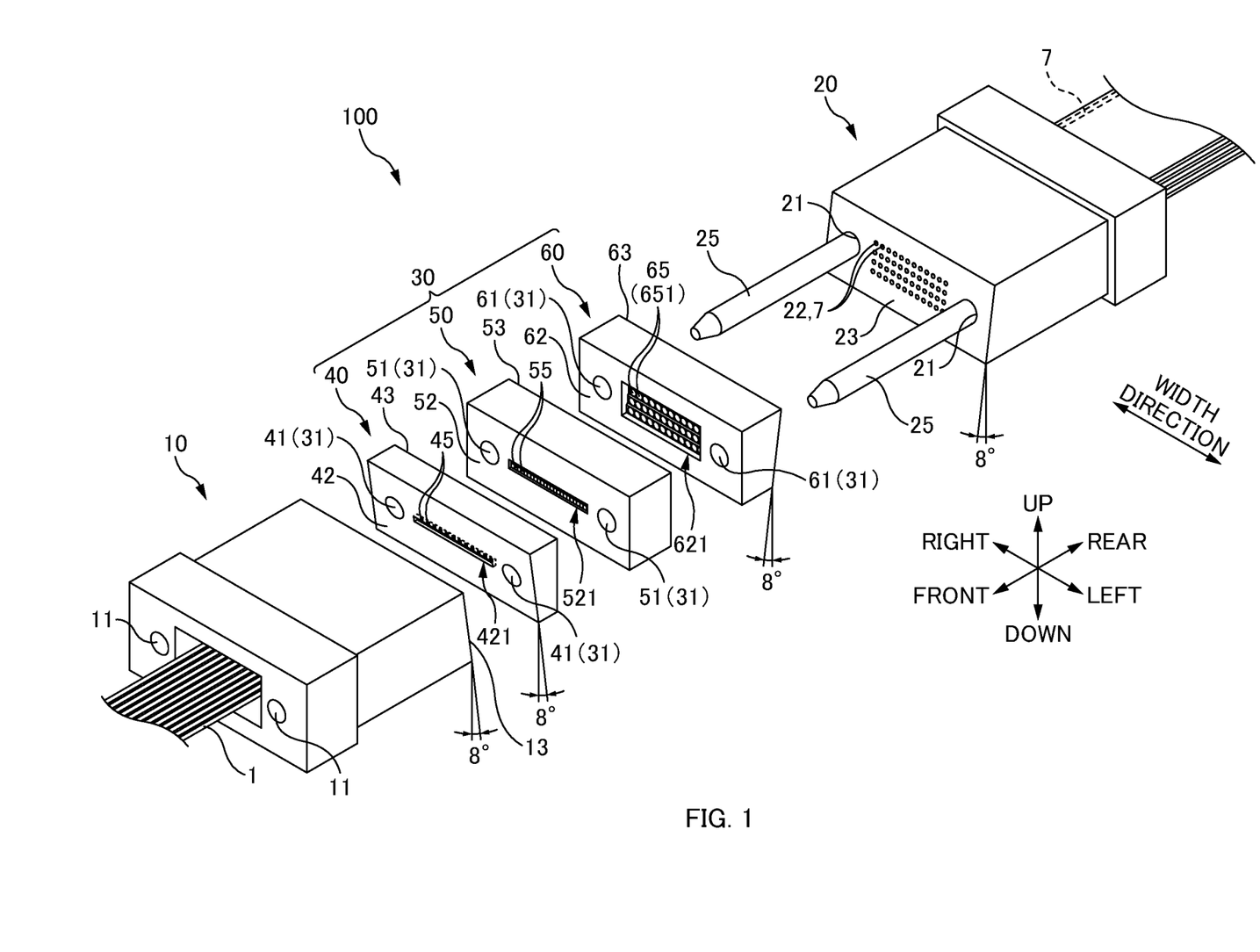
FIG. 1 is an exploded perspective view of a connector system 100 according to a first embodiment.
Figure 2:
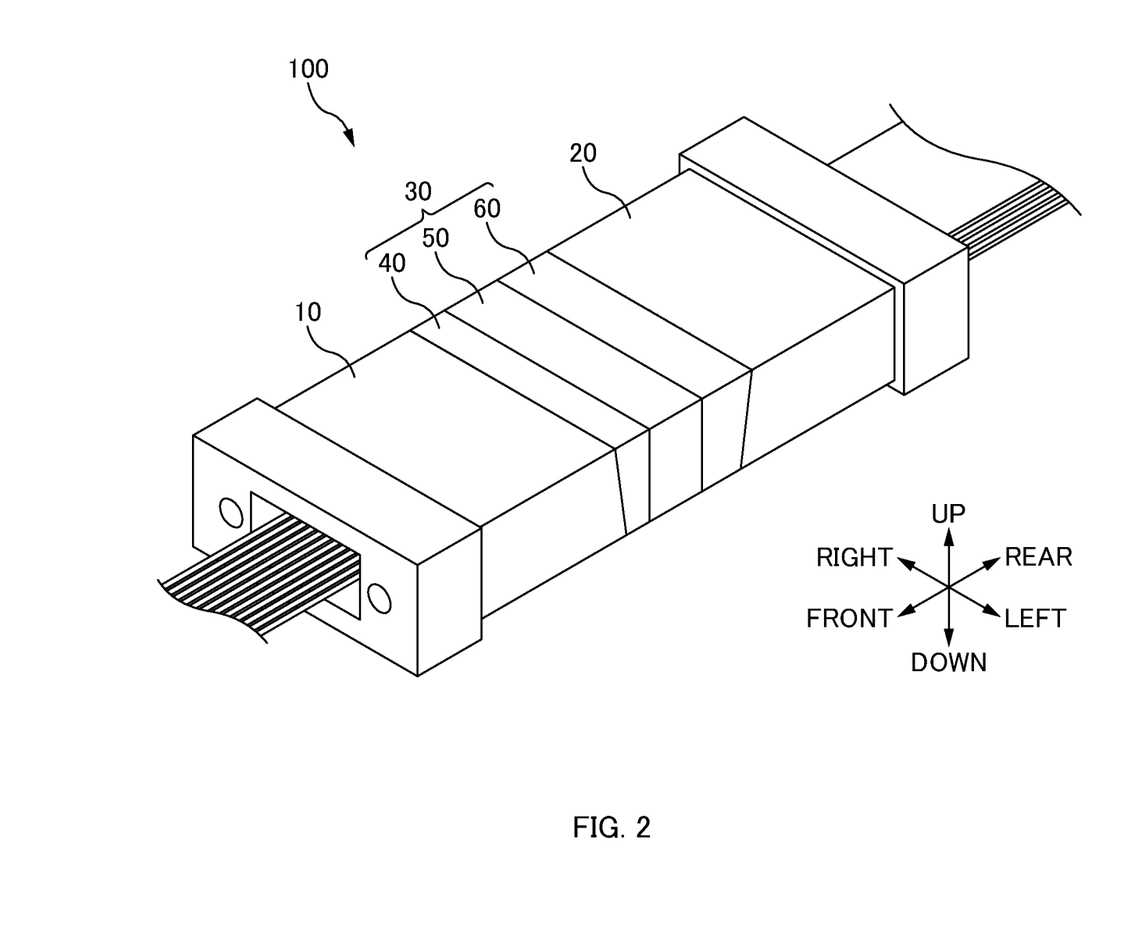
FIG. 2 is an explanatory diagram at the time of connection of the connector system 100 according to the first embodiment.
Figure 3A:
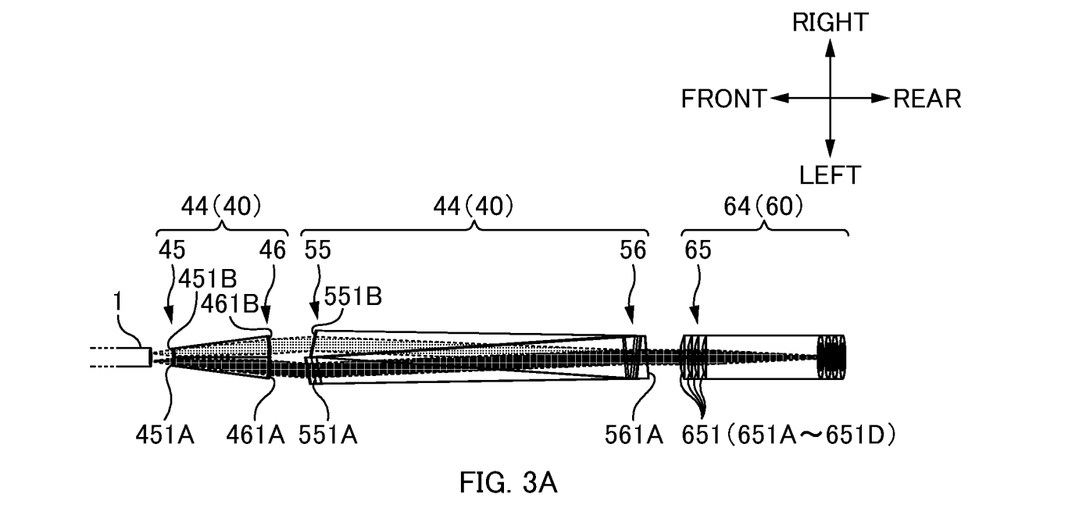
FIG. 3A is an explanatory diagram of when the optical system of one unit is viewed from above.
Figure 3B:
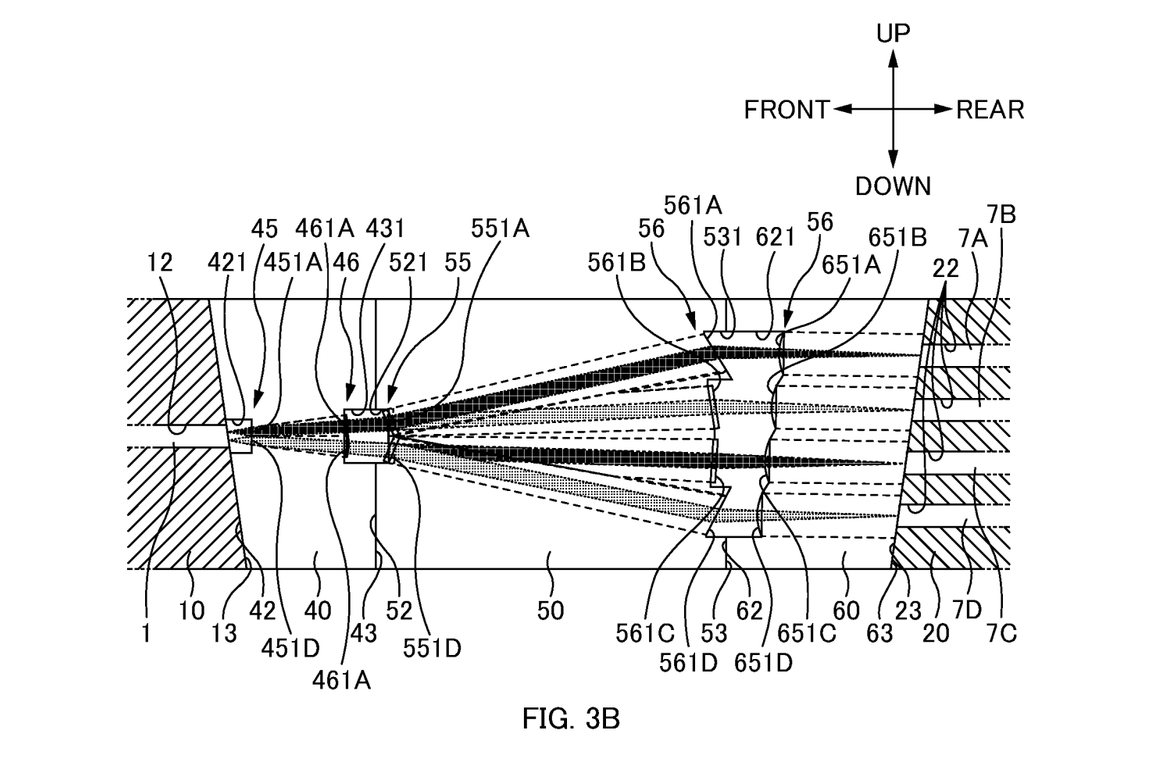
FIG. 3B is an explanatory diagram of when the optical system of one unit is viewed from the side (left).

FIG. 1 is an exploded perspective view of a connector system 100 according to a first embodiment. FIG. 2 is an explanatory diagram at the time of connection of the connector system 100 according to the first embodiment. FIGS. 3A and 3B are explanatory diagrams of an optical system of one unit. FIG. 3A is an explanatory diagram of when the optical system of one unit is viewed from above. FIG. 3B is an explanatory diagram of when the optical system of one unit is viewed from the side (left).

In the following description, directions will be defined as illustrated in FIG. 1. A direction parallel to an axis direction of guide pins 25 (or a direction parallel to a central axis of multi-core fibers 1) is a front-rear direction, a first ferrule 10 side is "front", and a second ferrule 20 side is "rear". A direction in which a plurality of multi-core fibers 1 held by the first ferrule 10 are aligned is a "width direction" or a "left-right direction". A direction perpendicular to the front-rear direction and the width direction is an "up-down direction". Here, a side of a protruding edge of an inclination end face of the first ferrule 10 is "down", and an opposite side is "up".

The connector system 100 according to the present embodiment is a structure that optically connects the multi-core fiber 1 and a single-core fiber 7 to each other.

Figure 4A:
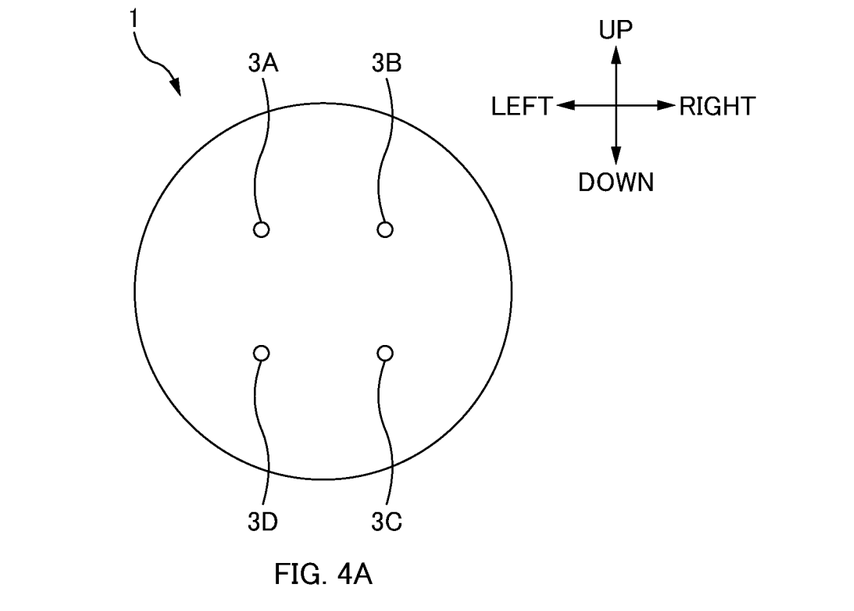
FIG. 4A is a cross-sectional view of a multi-core fiber 1.

FIG. 4A is a cross-sectional view of the multi-core fiber 1. The multi-core fiber 1 is an optical fiber including a plurality of cores 3. The multi-core fiber 1 according to the present embodiment includes four cores 3. In other words, when the number of the cores 3 included in one multi-core fiber 1 is N, N=4 in the present embodiment. In the present embodiment, reference signs of the cores are each provided with indexes A to D. In the following description, a reference sign of a member and a section may be provided with the same index as that of the core 3 corresponding to the member and the section. In the following description, the multi-core fiber 1 may be represented as an "MC fiber" or an "MCF".

The single-core fiber 7 (refer to FIG. 3B) is an optical fiber (single-core fiber) including one core. Here, the single-core fiber 7 is a single-mode optical fiber, and the single-core fiber 7 may be represented as an "SM fiber" or an "SMF" in the following description. However, the single-core fiber 7 is not limited to the single-mode optical fiber, and may be a multi-mode optical fiber. In the present embodiment, the single-core fiber 7 is optically connected to each core 3 included in the multi-core fiber 1. In other words, in the present embodiment, four single-core fibers 7 are optically connected to one multi-core fiber 1.

The connector system 100 according to the present embodiment includes the first ferrule 10, the second ferrule 20, and a connection unit 30 (refer to FIG. 1).

The first ferrule 10 is a ferrule that holds end parts of the plurality of multi-core fibers 1. The first ferrule 10 according to the present embodiment holds end parts of 12 multi-core fibers 1. When the number of the multi-core fibers 1 held by the first ferrule 10 is M, M=12 in the present embodiment. A structure of the first ferrule 10 is similar to that of a mechanically transferable (MT) optical connector (optical connector defined by JIS C 5981).

The first ferrule 10 includes a pair of guide holes 11 and a plurality of fiber holes 12 (refer to FIG. 3B: not illustrated in FIGS. 1 and 2).

The guide hole 11 is a hole for insertion of the guide pin 25. The guide hole 11 is formed along the front-rear direction. The pair of guide holes 11 are arranged in the width direction. The guide pins 25 fit in the guide holes 11, and thus the first ferrule 10 and a ferrule of a counterpart (here, the second ferrule 20) are aligned. The plurality of fiber holes 12 are formed between the pair of guide holes 11.

Each fiber hole 12 is a hole for insertion of the multi-core fibers 1. The fiber hole 12 is formed along the front-rear direction. The multi-core fiber 1 is inserted in each fiber hole 12, and the multi-core fiber 1 is fixed inside the fiber hole 12 with an adhesive. The plurality of (M) fiber holes 12 are arranged in the width direction. Here, 12 fiber holes 12 are arranged in the width direction (in other words, end faces of 12 multi-core fibers 1 are arranged in the width direction in a connecting end face 13 of the first ferrule 10).

As illustrated in FIG. 3B, the end face of the multi-core fiber 1 is exposed from an opening of the fiber hole 12 in the connecting end face 13 of the first ferrule 10. Note that a structure in which the end face of the multi-core fiber 1 is exposed from the opening of the fiber hole 12 is obtained by polishing the connecting end face 13 of the first ferrule 10 while the multi-core fiber 1 is fixed (bonded) to the fiber hole 12. In the present embodiment, the connecting end face 13 of the first ferrule 10 and the end face of the multi-core fiber 1 are inclined approximately 8 degrees to a plane perpendicular to the front-rear direction. An influence of reflection of an optical signal by the end face of the multi-core fiber 1 can be suppressed by inclining the end face. However, the connecting end face 13 of the first ferrule 10 and the end face of the multi-core fiber 1 may not be inclined, and the connecting end face 13 of the first ferrule 10 and the end face of the multi-core fiber 1 may be perpendicular to the front-rear direction.

The second ferrule 20 is a ferrule that holds end parts of the plurality of single-core fibers 7. Note that, when the number of the multi-core fibers 1 held by the first ferrule 10 is M and the number of the cores 3 of the multi-core fiber 1 is N, the second ferrule 20 holds M×N single-core fibers 7. In the present embodiment, since M=12 and N=4, the second ferrule 20 holds end parts of 48 single-core fibers 7. In FIG. 1, four optical fiber ribbons each formed of 12 single-core fibers 7 extend from the rear side of the second ferrule 20. A structure of the second ferrule 20 is similar to an MT optical connector.

The second ferrule 20 includes a pair of guide holes 21 and a plurality of (here, 48) fiber holes 22. The guide pins 25 are inserted into the guide holes 21 of the second ferrule 20, and the guide pins 25 protrude from a connecting end face 23 of the second ferrule 20. The guide pins 25 of the second ferrule 20 fit in the guide holes 11 of the first ferrule 10, and thus the first ferrule 10 and the second ferrule 20 are aligned. Note that the guide pins 25 may be located on the first ferrule 10 side instead of the second ferrule 20 side.

The single-core fiber 7 is inserted into the fiber hole 22 of the second ferrule 20, and the single-core fiber 7 is fixed inside of the fiber hole 22 with an adhesive. In the present embodiment, the plurality of fiber holes 22 are arranged such that M fiber holes in the width direction and N fiber holes in the up-down direction are arranged (in other words, the end faces of M single-core fibers 7 in the width direction and N single-core fibers 7 in the up-down direction are arranged in the connecting end face 23 of the second ferrule 20).

As illustrated in FIG. 3B, the end face of the single-core fiber 7 is exposed from an opening of the fiber hole 22 in the connecting end face 23 of the second ferrule 20. Note that a structure is such that the end face of the single-core fiber 7 is exposed from the opening of the fiber hole 22 by polishing the connecting end face 23 of the second ferrule 20 while the single-core fiber 7 is fixed (bonded) to the fiber hole 22. In the present embodiment, the connecting end face 23 of the second ferrule 20 and the end face of the single-core fiber 7 are inclined approximately 8 degrees to the plane perpendicular to the front-rear direction. An influence of reflection of an optical signal by the end face of the single-core fiber 7 can be suppressed by inclining the end face. However, the connecting end face 23 of the second ferrule 20 and the end face of the single-core fiber 7 may not be inclined, and the connecting end face 23 of the second ferrule 20 and the end face of the single-core fiber 7 may be perpendicular to the front-rear direction.

The connection unit 30 is an optical connection member that optically connects each core 3 of the multi-core fiber 1 and the single-core fiber 7 to each other. The connection unit 30 may be referred to as a fan-out member (or a fan-out structure, a fan-out unit). The connection unit 30 is arranged between the first ferrule 10 and the second ferrule 20. The connection unit 30 is formed of a material that can transmit an optical signal. The connection unit 30 includes an optical system that optically connects each core 3 of the multi-core fiber 1 and the single-core fiber 7 to each other. When an optical system that optically connects one multi-core fiber 1 and N (here, four) single-core fibers 7 to each other is assumed to be one optical system unit, the connection unit 30 includes M (here, 12) optical system units. Here, the M optical system units are each provided so as to correspond to the multi-core fiber 1, and are aligned in the width direction.

Figure 5:
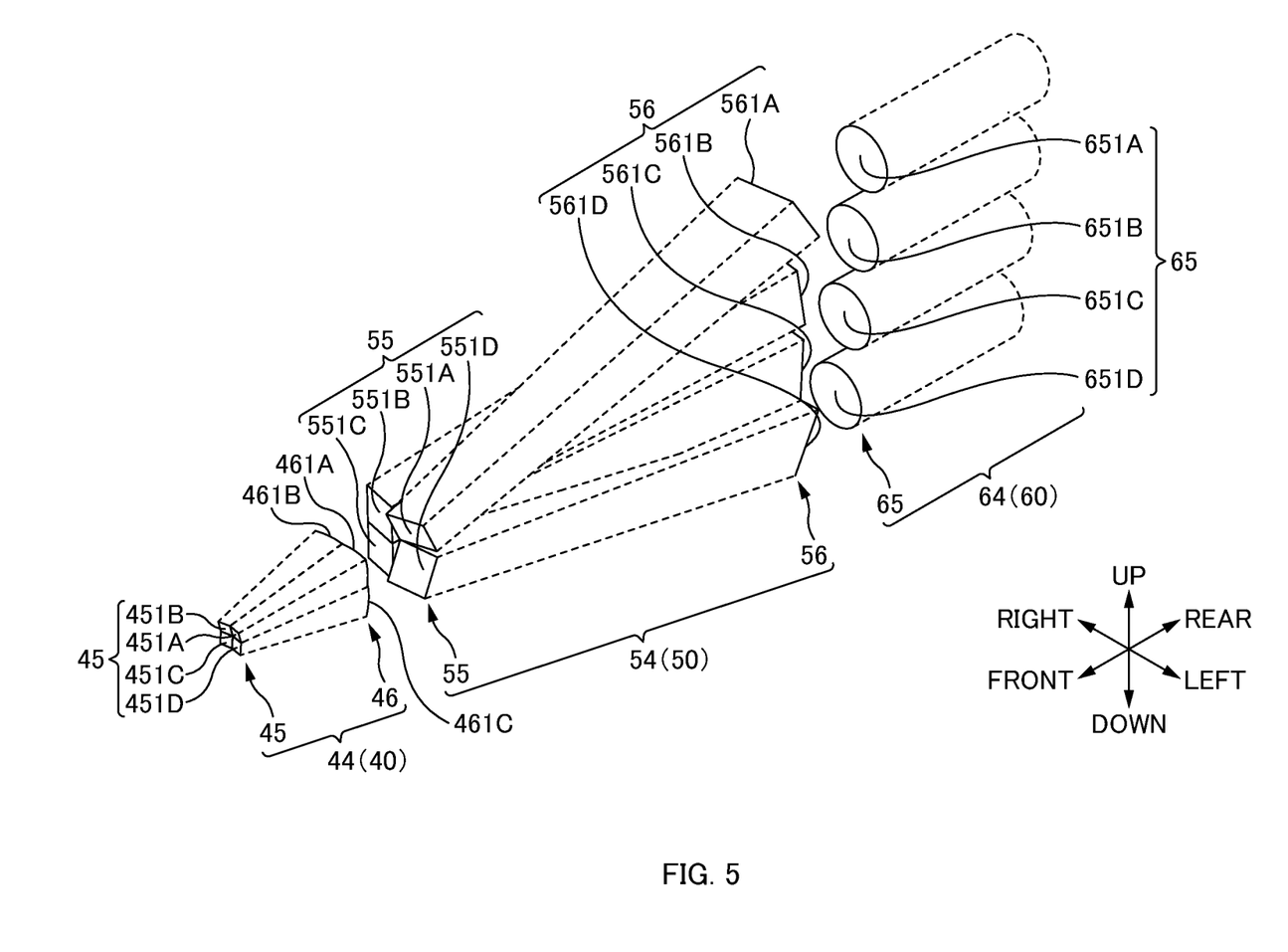
FIG. 5 is an explanatory diagram of an optical system (optical system unit) of one unit.
Figure 6:
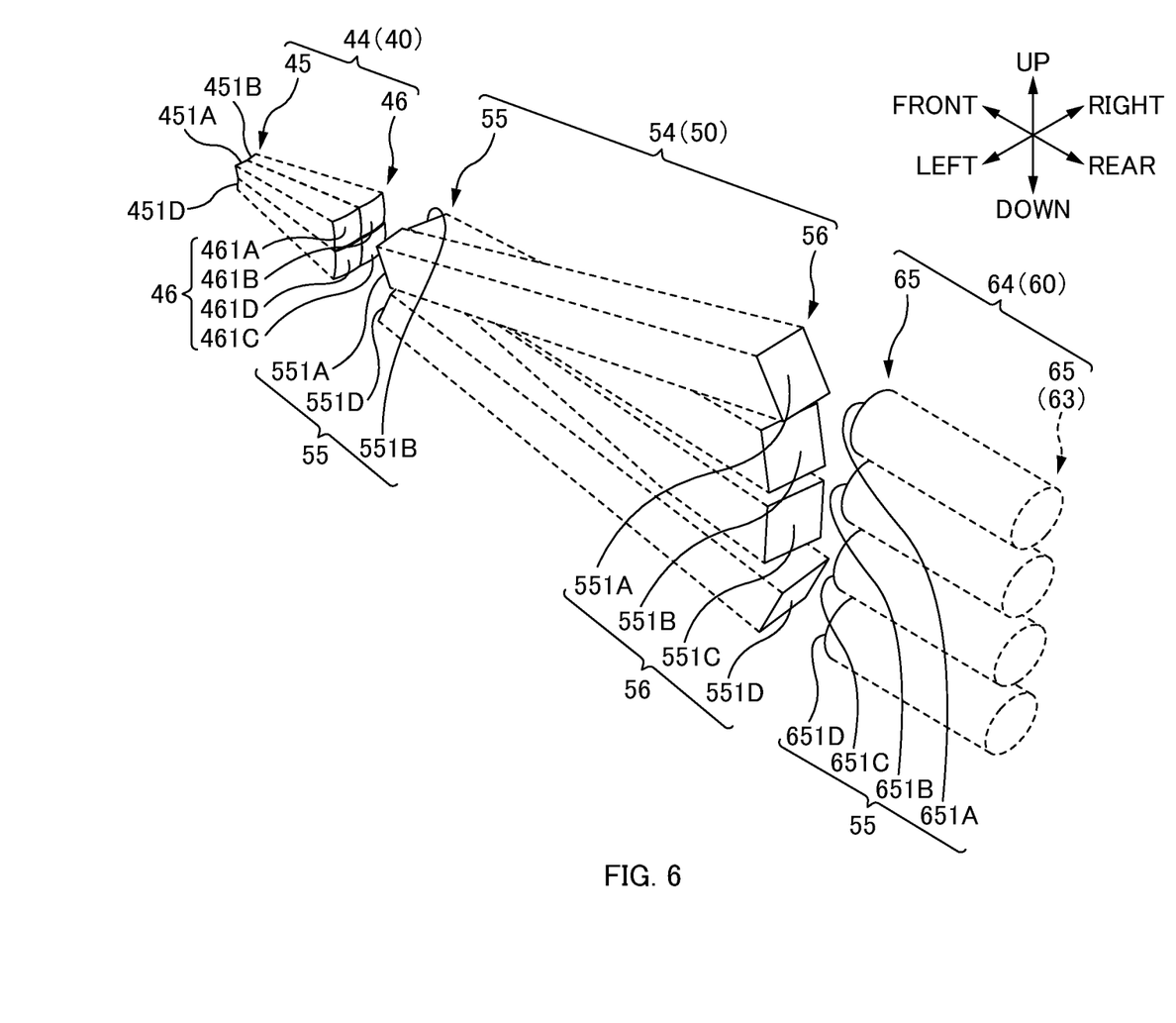
FIG. 6 is an explanatory diagram when the optical system (optical system unit) of one unit is viewed from a different direction.

FIGS. 5 and 6 are explanatory diagrams of an optical system (optical system unit) of one unit. Here, the optical system (one optical system unit) that optically connects N (here, four) single-core fibers 7 to one multi-core fiber 1 includes a first optical system 44, an optical path conversion optical system 54, and a second optical system 64. In the drawings, virtual lens barrels of the optical system are indicated by dot lines. However, the lens barrels indicated by the dot lines do not actually exist, and M optical systems aligned in the width direction are each integrally formed of an optical component (a first lens plate 40, a relay plate 50, or a second lens plate 60 described later). In other words, the virtual lens barrels of the optical system of one unit are illustrated by the dot lines in the drawings, but boundaries (for example, the lens barrels) do not exist between the M optical systems arranged in the width direction. An optical element (element) constituting each optical system will be described later.

The connection unit 30 has a pair of through holes 31. The M optical units are arranged between the pair of through holes 31. The through holes 31 are holes for insertion of the guide pins 25. The guide pins 25 fit in the through holes 31, and thus the second ferrule 20 and the connection unit 30 are aligned. The guide pins 25 of the second ferrule 20 fit in the guide holes 11 of the first ferrule 10 through the through holes 31 of the connection unit 30, and thus three of the first ferrule 10, the connection unit 30, and the second ferrule 20 can be aligned together. In this way, in the present embodiment, three of the first ferrule 10, the connection unit 30, and the second ferrule 20 can be passively aligned with a simple configuration. In other words, in the present embodiment, three of the multi-core fiber 1, the single-core fibers 7, and the optical system that optically connects the multi-core fiber 1 and the single-core fiber 7 to each other can be passively aligned with a simple configuration.

Note that a spring mechanism (bias mechanism), which is not illustrated, presses the first ferrule 10 toward the second ferrule 20, and also presses the second ferrule 20 toward the first ferrule 10. A front end face of the connection unit 30 (an end face on the first ferrule 10 side; a first end face 42 of the first lens plate 40) abuts the connecting end face 13 of the first ferrule 10, and is in contact with the connecting end face 13 of the first ferrule 10. In this way, the connection unit 30 and the first ferrule 10 are aligned in the front-rear direction. In the present embodiment, since the connecting end face 13 of the first ferrule 10 is inclined, the front end face of the connection unit 30 is also inclined.

Similarly, a rear end face of the connection unit 30 (an end face on the second ferrule 20 side; a second end face 63 of the second lens plate 60) abuts the connecting end face 23 of the second ferrule 20, and is in contact with the connecting end face 23 of the second ferrule 20. In this way, the connection unit 30 and the second ferrule 20 are aligned in the front-rear direction. In the present embodiment, since the connecting end face 23 of the second ferrule 20 is inclined, the rear end face of the connection unit 30 is also inclined.

The connection unit 30 includes the first lens plate 40, the relay plate 50, and the second lens plate 60.

When light is emitted from the multi-core fiber 1, the light is divided into N optical paths by the first lens plate 40, and four collimated light beams are emitted from the first lens plate 40 to the relay plate 50. The four collimated light beams incident on the relay plate 50 each have an optical path being converted by the relay plate 50, and are emitted, to the second lens plate 60, as four collimated light beams aligned in the up-down direction. The four collimated light beams incident on the second lens plate 60 are converged by the second lens plate 60, and are incident on the end faces of respective single-core fibers 7.

When light is emitted from four single-core fibers 7, four collimated light beams are emitted from the second lens plate 60 to the relay plate 50. The four collimated light beams incident on the relay plate 50 each have an optical path being converted by the relay plate 50, and are emitted, to the first lens plate 40, as four collimated light beams, two in the width direction and two in the up-down direction. The four collimated light beams incident on the first lens plate 40 are converged by the first lens plate 40, and are incident on respective cores 3 of the multi-core fiber 1.

Note that, in the following description, a case where light is emitted from the multi-core fiber 1 will be mainly described, and description of a case where light is emitted from four single-core fibers 7 may be omitted.

The first lens plate 40 is a plate attached to the connecting end face 13 of the first ferrule 10. The first lens plate 40 causes light emitted from each core 3 of the multi-core fiber 1 to be collimated light, and emits the collimated light to the relay plate 50. Alternatively, the first lens plate 40 converges collimated light incident from the relay plate 50 to each core 3 of the multi-core fiber 1. The first lens plate 40 is formed of a material that can transmit an optical signal. The first lens plate 40 may be referred to as a first collimator plate, an MCF side collimator plate, and the like. The first lens plate 40 includes a pair of through holes 41, the first end face 42, a second end face 43, and the plurality of (M) first optical systems 44.

The through hole 41 is a hole constituting a part of the through hole 31 of the connection unit 30, and is a hole for insertion of the guide pin 25. The plurality of first optical systems 44 (and a first recessed part 421 and a second recessed part 431) are arranged between the pair of through holes 41.

The first end face 42 is an end face that comes into contact with the connecting end face 13 of the first ferrule 10. The first end face 42 abuts the connecting end face 13 of the first ferrule 10, and thus the first lens plate 40 and the first ferrule 10 are aligned in the front-rear direction. In the present embodiment, since the connecting end face 13 of the first ferrule 10 is inclined, the first end face 42 (the front end face of the connection unit 30) is also inclined. The first recessed part 421 is formed in the first end face 42.

The second end face 43 is an end face that comes into contact with the relay plate 50. The second end face 43 abuts a first end face 52 of the relay plate 50, and thus the first lens plate 40 and the relay plate 50 are aligned in the front-rear direction. The second recessed part 431 is formed in the second end face 43.

The first recessed part 421 is a recessed part formed in the first end face 42 on the front side (the first ferrule 10 side; the multi-core fiber 1 side) of the first lens plate 40. The second recessed part 431 is a recessed part formed in the second end face 43 on the rear side (the relay plate 50 side) of the first lens plate 40. An optical element of the first optical system 44 (a first end optical unit 45 and a first lens unit 46) is formed on a bottom surface of the first recessed part 421 and the second recessed part 431. Damage to the optical element can be suppressed by providing the optical element on the bottom surface of the first recessed part 421 and the second recessed part 431.

The first optical system 44 is an optical system constituted by the first lens plate 40. The first lens plate 40 includes the M first optical systems 44 aligned in the width direction. The first optical system 44 includes the first end optical unit 45 and the first lens unit 46.

The first end optical unit 45 is an optical element (optical element group) arranged so as to face the multi-core fiber 1. The first end optical unit 45 has a function of spreading an optical path interval of a plurality of (here, four) optical signals corresponding to respective cores 3 of the multi-core fiber 1 further toward the relay plate 50 side. For example, the first end optical unit 45 is constituted as an N-branch prism. In the present embodiment, the first end optical unit 45 is constituted as a four-branch prism, and has a pyramid shape (tetrahedral shape being recessed in an inverted pyramid shape from the bottom surface of the recessed part).

Figure 4B:
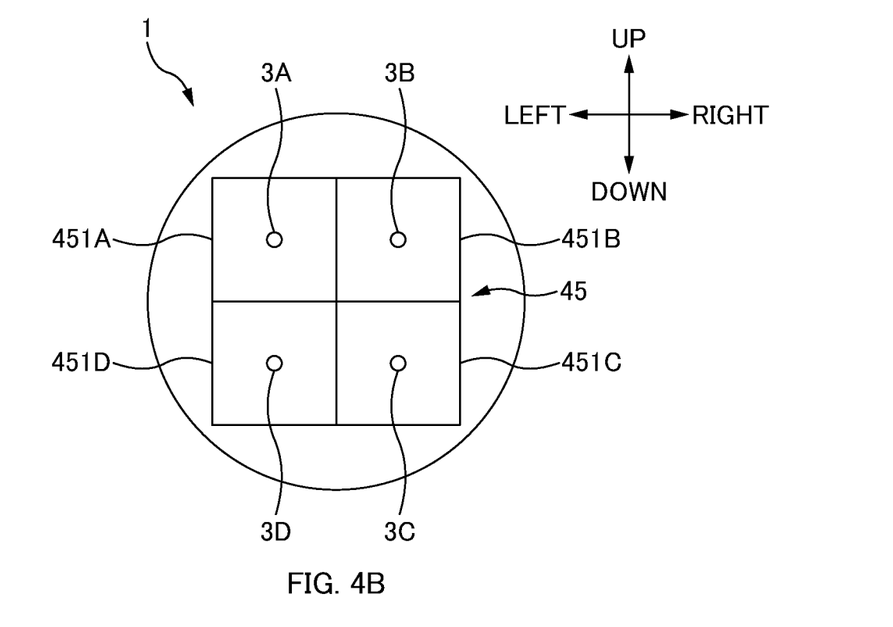
FIG. 4B is a diagram illustrating a positional relationship between the multi-core fiber 1 and a first end optical unit 45 when transparently viewed from a front-rear direction.

FIG. 4B is a diagram illustrating a positional relationship between the multi-core fiber 1 and the first end optical unit 45 when transparently viewed from the front-rear direction.

The first end optical unit 45 includes a plurality of (N) first end optical elements 451. Each first end optical element 451 is an optical element (prism surface) arranged so as to face the core 3 of the multi-core fiber 1. The first end optical element 451 forms a boundary surface (inclination surface) that refracts an optical signal. The first end optical element 451 has a function of converting an optical path of an optical signal.

The plurality of first end optical elements 451 have normal directions different from each other. In other words, the plurality of first end optical elements 451 are inclination surfaces being inclined in different directions. Specifically, in the present embodiment, four first end optical elements 451 constitute the first end optical unit 45 (four-branch prism) having a pyramid shape. The plurality of (N) first end optical elements 451 having normal directions different from each other spread an interval between a plurality of (N) optical paths formed between the first end optical unit 45 and the first lens unit 46 further toward the relay plate 50 side. In other words, the plurality of first end optical elements 451 are constituted such that an interval between a plurality of optical paths formed between the first end optical unit 45 and the first lens unit 46 spreads further toward the relay plate 50 side.

In the present embodiment, the first end optical unit 45 is formed in a pyramid shape (tetrahedral shape being recessed in an inversed pyramid shape from the bottom surface of the recessed part), and all of normal lines of the four first end optical elements 451 (prism surfaces) constituting the first end optical unit 45 are inclined with respect to the front-rear direction (the direction parallel to the central axis of the multi-core fiber 1). In this way, an influence of reflection of an optical signal by the first end optical element 451 (return of an optical signal reflected by the first end optical element 451 to the core 3 of the multi-core fiber 1) can be suppressed.

The first lens unit 46 is an optical element (optical element group) arranged so as to correspond to the first end optical unit 45. The first lens unit 46 is an optical element (optical element group) arranged so as to correspond to the multi-core fiber 1. The first lens unit 46 has a function of causing a light emitted from each core 3 of the multi-core fiber 1 to be collimated light, and a function of converging incident collimated light to each core 3 of the multi-core fiber 1.

The first lens unit 46 includes a plurality of (N) first lenses 461. The first lens 461 is an optical element (lens) arranged so as to correspond to the core 3 of the multi-core fiber 1 and the first end optical element 451. The first lens 461 is a collimating lens, and has a function of causing light emitted from the core 3 to be collimated light, and a function of converging incident collimated light. In other words, the first lens 461 is constituted such that collimated light propagates between the first lens plate 40 and the relay plate 50 (specifically, between the first lens 461 and the first optical element 551). In the present embodiment, the first lens unit 46 includes four first lenses 461, two in the width direction and two in the up-down direction.

In the present embodiment, since the first end optical unit 45 spreads an interval between optical paths, an interval between two first lenses 461 aligned in the width direction or the up-down direction can be set greater than an interval between the cores 3 of the multi-core fiber 1. In such a manner, in the present embodiment, the first end optical unit 45 can suppress an interference (crosstalk) between optical signals.

Note that, when there is no problem of an interference between optical signals, the first end optical unit 45 may not be provided in the first lens plate 40. When the first end optical unit 45 is not provided in the first lens plate 40, there may be no gap between the first end face 42 of the first lens plate 40 and the multi-core fiber 1, and thus the first recessed part 421 may not be formed in the first end face 42. In order to suppress attenuation of an optical signal between the first end face 42 of the first lens plate 40 and the end face of the multi-core fiber 1, a refractive index matching material may fill the gap between the first end face 42 of the first lens plate 40 and the end face of the multi-core fiber 1.

The relay plate 50 is a plate arranged between the first lens plate 40 and the second lens plate 60. The relay plate 50 emits collimated light incident from the first lens plate 40 as collimated light to the second lens plate 60. Alternatively, the relay plate 50 emits collimated light incident from the second lens plate 60 as collimated light to the first lens plate 40. The relay plate 50 is formed of a material that can transmit an optical signal. The relay plate 50 may be referred to as an optical path conversion plate, a beam steering plate, or a prism device. The relay plate 50 includes a pair of through holes 51, the first end face 52, a second end face 53, and the plurality of (M) optical path conversion optical systems 54.

The through hole 51 is a hole constituting a part of the through hole 31 of the connection unit 30, and is a hole for insertion of the guide pin 25. The plurality of optical path conversion optical systems 54 (and a first recessed part 521 and a second recessed part 531) are arranged between the pair of through holes 51.

The first end face 52 is an end face that comes in contact with the first lens plate 40. The first recessed part 521 is formed in the first end face 52. The second end face 53 is an end face that comes in contact with the second lens plate 60. The second end face 53 abuts a first end face 62 of the second lens plate 60, and thus the relay plate 50 and the second lens plate 60 are aligned in the front-rear direction. The second recessed part 531 is formed in the second end face 53.

The first recessed part 521 is a recessed part formed in the first end face 52 on the front side (the first lens plate 40 side) of the relay plate 50. The second recessed part 531 is a recessed part formed in the second end face 53 on the rear side (the second lens plate 60 side) of the relay plate 50. An optical element (a first optical unit 55 and a second optical unit 56) of the optical path conversion optical system 54 is formed on a bottom surface of the first recessed part 521 and the second recessed part 531. Damage to the optical element can be suppressed by providing the optical element on the bottom surface of the first recessed part 521 and the second recessed part 531.

The optical path conversion optical system 54 is an optical system constituted by the relay plate 50. The relay plate 50 includes the M optical path conversion optical systems 54 aligned in the width direction. In the present embodiment, the optical path conversion optical system 54 is constituted by a prism optical system. However, the optical path conversion optical system 54 can also be constituted by a reflection optical system. The optical path conversion optical system 54 includes the first optical unit 55 and the second optical unit 56.

The first optical unit 55 is an optical element (optical element group) arranged so as to face the first lens unit 46. The first optical unit 55 includes a plurality of (N) first optical elements 551. The first optical element 551 is an optical element (prism surface) arranged so as to face the first lens 461 of the first lens unit 46. The first optical element 551 forms a boundary surface (inclination surface) that refracts an optical signal. The first optical element 551 has a function of converting an optical path of an optical signal. The plurality of first optical elements 551 have normal directions different from each other. In other words, the plurality of first optical elements 551 are inclination surfaces being inclined in different directions. Each of the first optical elements 551 is constituted such that an optical signal propagates between a corresponding second optical element 561 and the first optical element 551.

The second optical unit 56 is an optical element arranged so as to face the second lens unit 65. The second optical unit 56 includes a plurality of (N) second optical elements 561. The second optical element 561 is an optical element (prism surface) arranged so as to face the second lens 651 of the second lens unit 65. The second optical element 561 forms a boundary surface (inclination surface) that refracts an optical signal. The second optical element 561 has a function of converting an optical path of an optical signal. The plurality of second optical elements 561 have normal directions different from each other. In other words, the plurality of second optical elements 561 are inclination surfaces being inclined in different directions. Each of the second optical elements 561 is constituted such that an optical signal propagates between a corresponding first optical element 551 and the second optical element 561.

Four first optical elements 551 of the first optical unit 55 are aligned such that two are aligned in the width direction and two are aligned in the up-down direction (2×2 arrangement). In contrast, four second optical elements 561 of the second optical unit 56 are aligned such that one is aligned in the width direction and four are aligned in the up-down direction (1×4 arrangement). In such a manner, even with the first optical unit 55 and the second optical unit 56 corresponding to the same multi-core fiber 1, the arrangement (here, the 2×2 arrangement) of the four first optical elements 551 and the arrangement (here, the 1×4 arrangement) of the four second optical elements 561 are different from each other. In other words, the optical path conversion optical system 54 is constituted so as to convert each optical path between the four first optical elements 551 and the four second optical elements 561 in the different arrangements.

The second lens plate 60 is a plate attached to the connecting end face 23 of the second ferrule 20. The second lens plate 60 converges collimated light incident from the relay plate 50 to the single-core fiber 7. Alternatively, the second lens plate 60 causes light emitted from the single-core fiber 7 to be collimated light, and emits the collimated light to the relay plate 50. The second lens plate 60 is formed of a material that can transmit an optical signal. The second lens plate 60 may be referred to as a second collimator plate, an SMF side collimator plate, and the like. The second lens plate 60 includes a pair of through holes 61, the first end face 62, the second end face 63, and the plurality of (M) second optical systems 64.

The through hole 61 is a hole constituting a part of the through hole 31 of the connection unit 30, and is a hole for insertion of the guide pin 25. A first recessed part 621 and the plurality of second optical systems 64 are arranged between the pair of through holes 61.

The first end face 62 is an end face that comes in contact with the relay plate 50. The first recessed part 621 is formed in the first end face 62. The second end face 63 is an end face that comes in contact with the connecting end face 23 of the second ferrule 20. The second end face 63 abuts the connecting end face 23 of the second ferrule 20, and thus the second lens plate 60 and the second ferrule 20 are aligned in the front-rear direction. The second end face 63 is formed in a flat surface. In the present embodiment, since the connecting end face 23 of the second ferrule 20 is inclined, the second end face 63 (the rear end face of the connection unit 30) is also an inclined flat surface. The second end face 63 forms a signal surface through which an optical signal is incident on or emitted to the single-core fiber 7. Since there may not be a gap between the second end face 63 of the second lens plate 60 and the end face of the single-core fiber 7, a recessed part is not formed in the second end face 63 of the second lens plate 60. In order to suppress attenuation of an optical signal between the second end face 63 of the second lens plate 60 and the end face of the single-core fiber 7, a refractive index matching material may fill in the gap between the second end face 63 of the second lens plate 60 and the end face of the single-core fiber 7.

The first recessed part 621 is a recessed part formed in the first end face 62 on the front side (the relay plate 50 side) of the second lens plate 60. An optical element (a second lens unit 65) of the second optical system 64 is formed on a bottom surface of the first recessed part 621. Damage to the optical element can be suppressed by locating the optical element on the bottom surface of the first recessed part 621.

The second optical system 64 is an optical system constituted by the second lens plate 60. The second lens plate 60 includes the M second optical systems 64 aligned in the width direction. The second optical system 64 includes the second lens unit 65. The second lens unit 65 is an optical element (optical element group) arranged so as to correspond to the plurality of (N) single-core fibers 7. The second lens unit 65 is an optical element (optical element group) arranged so as to correspond to the multi-core fiber 2.

The second lens unit 65 includes a plurality of (N) second lenses 651. The second lens 651 is an optical element (lens) arranged so as to correspond to the single-core fiber 7. The second lens 651 is a collimating lens, and has a function of converging incident collimated light, and a function of causing light emitted from the single-core fiber 7 to be collimated light. In other words, the second lens 651 is constituted such that collimated light propagates between the second lens plate 60 and the relay plate 50 (specifically, between the second lens 651 and the second optical element 561). In the present embodiment, the second lens unit 65 includes four second lenses 651 aligned in the up-down direction.

As described above, the connection unit 30 (optical connection member) according to the present embodiment includes the first lens plate 40, the second lens plate 60, and the relay plate 50. The first lens plate 40 includes the plurality of first lenses 461 corresponding to the multi-core fiber 1, and the first lens 461 is constituted such that collimated light propagates between the first lens 461 and the first optical element 551 of the relay plate 50. The second lens plate 60 includes the plurality of second lenses 651 each corresponding to the single-core fiber 7, and the second lens 651 is constituted such that collimated light propagates between the second lens 651 and the second optical element 561 of the relay plate 50.

Here, the four first lenses 461 of the first lens unit 46 are aligned such that two are aligned in the width direction and two are aligned in the up-down direction (2×2 arrangement), similarly to the core arrangement of the multi-core fiber 1 (refer to FIG. 4B). In contrast, the four second lenses 651 of the second lens unit 65 are aligned such that one is aligned in the width direction and four are aligned in the up-down direction (1×4 arrangement). In such a manner, the arrangements of the four first lenses 461 and the four second lenses 651 corresponding to the same multi-core fiber 1 are different from each other. Thus, in the present embodiment, the optical path conversion optical system 54 (prism optical system formed of the first optical element 551 and the second optical element 561) of the relay plate 50 is constituted such that an optical signal propagates between the first optical element 551 and the second optical element 561. In this way, even when the arrangement (2×2 arrangement) of the cores 3 of the multi-core fiber 1 and the arrangement (1×4 arrangement) of the plurality of single-core fibers 7 are different from each other, the multi-core fiber 1 and the plurality of single-core fibers 7 can be optically connected to each other with a simple configuration.

In the embodiment described above, the pair of through holes 31 are provided in each of the first lens plate 40, the second lens plate 60, and the relay plate 50 of the connection unit 30, and the guide pins 25 that aligned the first ferrule 10 and the second ferrule 20 fit in the through holes 31, and thus the first lens plate 40, the second lens plate 60, and the relay plate 50 can be aligned with respect to the first ferrule 10 and the second ferrule 20. In this way, the first lens plate 40, the second lens plate 60, and the relay plate 50 can be aligned with respect to the first ferrule 10 and the second ferrule 20 with a simple configuration, and the multi-core fiber 1 and the plurality of single-core fibers 7 can be optically connected to each other with a simple configuration.

Note that, in the present embodiment, the first lens plate 40, the second lens plate 60, and the relay plate 50 of the connection unit 30 are formed of separate members, but the connection unit 30 may be integrally formed.

In the embodiment described above, the plurality of first end optical elements 451 are constituted such that an interval between a plurality of optical paths formed between the first end optical unit 45 and the first lens unit 46 spreads further toward the relay plate 50 side. In this way, the first end optical unit 45 can suppress an interference (crosstalk) between optical signals.

In the embodiment described above, the plurality of (M) multi-core fibers 1 held by the first ferrule 10 are aligned in the width direction (left-right direction). In contrast, the plurality of (N) second optical elements 561 corresponding to each multi-core fiber 1 are arranged along the up-down direction perpendicular to the width direction. In this way, the plurality of (N) second optical elements 561 can be arranged in a region being narrow in the width direction, and thus many (M×N) fiber holes 22 can be arranged in a predetermined region in the width direction of the connecting end face 23 of the second ferrule 20. Note that, if the plurality of (N) second optical elements 561 are arranged in the 2×2 arrangement similarly to the core arrangement of the multi-core fiber 1, twice as much as the fiber holes 22 needs to be arranged in the width direction of the connecting end face 23 of the second ferrule 20, and thus it is difficult to arrange many (M×N) fiber holes 22 between the two guide pins 25.

In the embodiment described above, collimated light propagating between the second lens 651 of the second lens plate 60 and the second optical element 561 of the relay plate 50 is in a direction (front-rear direction) parallel to the axis direction of the guide pins 25. In this way, even if a positional relationship between the second lens plate 60 and the relay plate 50 is slightly shifted in the front-rear direction along the guide pins 25, a signal loss can be suppressed.

Second Embodiment

Figure 7A:
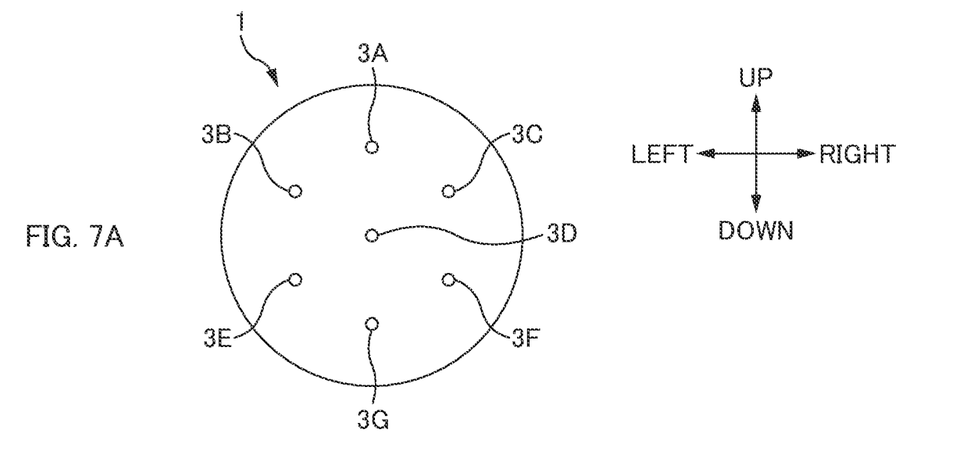
FIG. 7A is a cross-sectional view of a different multi-core fiber 1.

FIG. 7A is a cross-sectional view of a different multi-core fiber 1. The number of cores 3 of the multi-core fiber 1 is not limited to four, and may be seven. Note that, when the cores 3 of the multi-core fiber 1 are seven, a core 3D may be arranged on a central axis of the multi-core fiber 1.

Figure 7B:
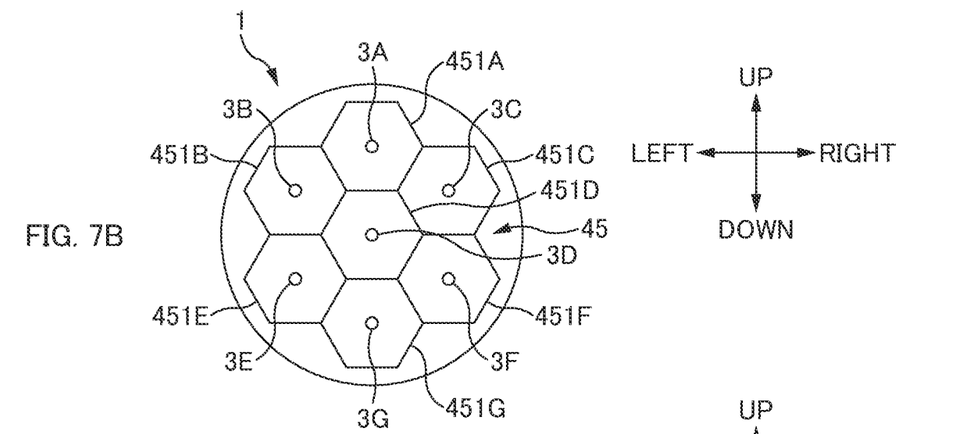
FIG. 7B is a diagram illustrating a positional relationship between the multi-core fiber 1 and the first end optical unit 45 when transparently viewed from the front-rear direction.
Figure 7C:
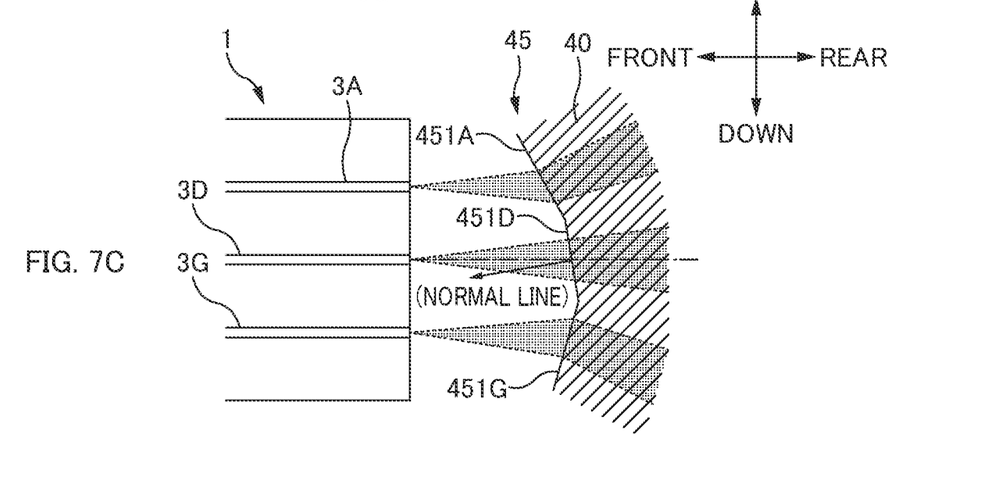
FIG. 7C is an explanatory diagram of when the multi-core fiber 1 and the first end optical unit 45 are viewed from the side (left).

FIG. 7B is a diagram illustrating a positional relationship between the multi-core fiber 1 and a first end optical unit 45 when transparently viewed from the front-rear direction. FIG. 7C is an explanatory diagram when the multi-core fiber 1 and the first end optical unit 45 are viewed from the left-right direction. Also in a second embodiment, all of normal lines of seven first end optical elements 451 (prism surfaces) constituting the first end optical unit 45 (seven-branch prism) are inclined with respect to the front-rear direction (direction parallel to the central axis of the multi-core fiber 1).

If the first end optical unit 45 constituted by the seven-branch prism is symmetrically constituted, a normal line of a first end optical element 451D located at the center is in the front-rear direction. As a result, an optical signal reflected by the first end optical element 451D returns to the core 3D of the multi-core fiber 1, and thus there is a possibility that an influence of reflected return light may be exerted. In contrast, in the second embodiment, even for the first end optical element 451D located at the center of the first end optical unit 45, a normal line of the first end optical element 451D (prism surface) is inclined with respect to the front-rear direction. In such a manner, even under a situation where the core 3 is arranged on the central axis of the multi-core fiber 1, all of the normal lines of the plurality of (N) first end optical elements 451 (prism surface) constituting the first end optical unit may be inclined with respect to the front-rear direction. In this way, an influence of reflection of an optical signal by the first end optical element 451 can be suppressed.

As described above, when the number of the cores 3 included in one multi-core fiber 1 is N, N is not limited to four and may be another number. Similarly, when the number of the multi-core fibers 1 held by a first ferrule 10 is M, M is not limited to 12 and may be another number.

Third Embodiment

Figure 8:
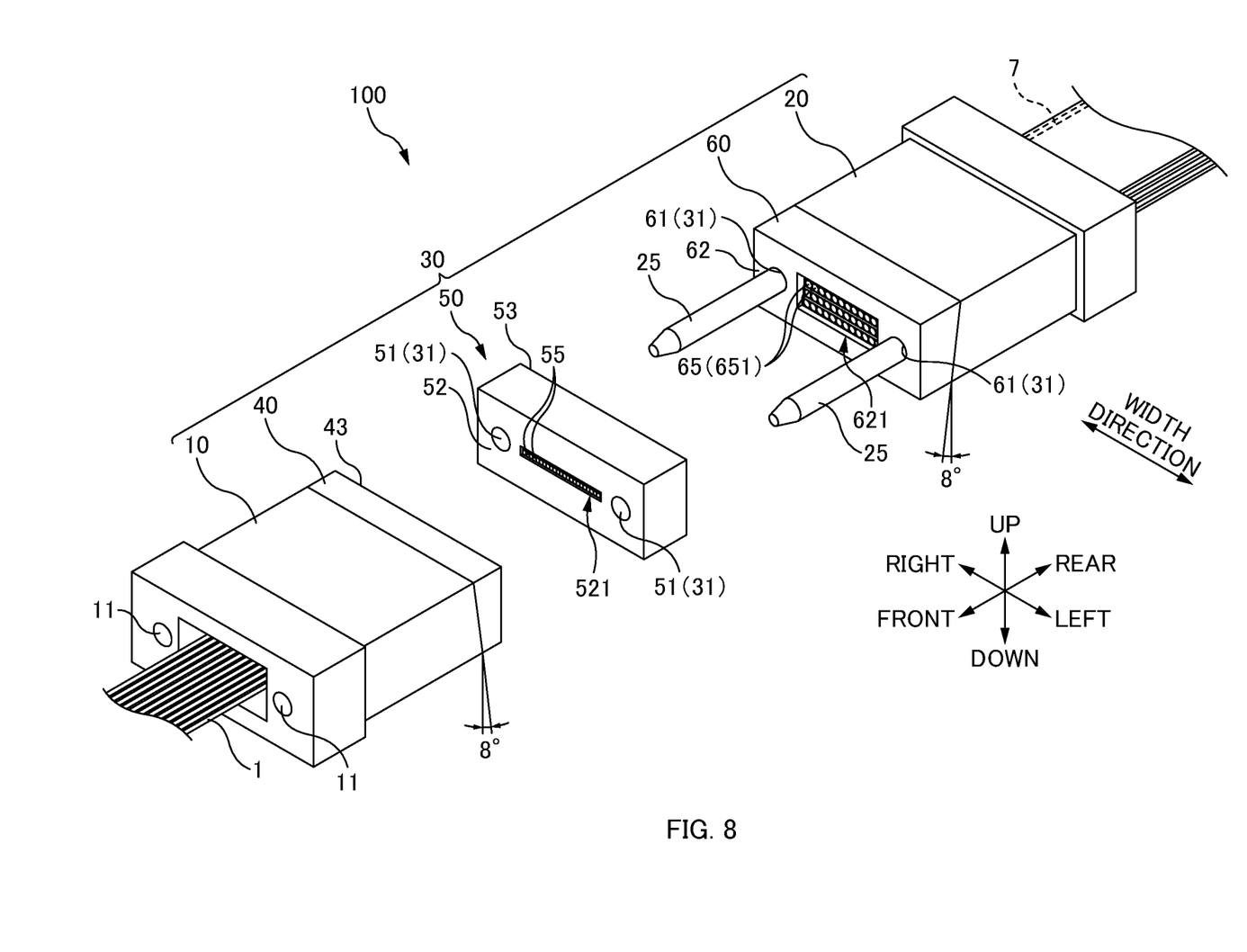
FIG. 8 is an exploded perspective view of a connector system 100 according to a third embodiment.

FIG. 8 is an exploded perspective view of a connector system 100 according to a third embodiment.

In the third embodiment, a first lens ferrule is formed by previously bonding and fixing a first lens plate 40 to a first ferrule 10. A second lens ferrule is formed by previously bonding and fixing a second lens plate 60 to a second ferrule 20. Then, a relay plate 50 is arranged between the first lens ferrule and the second lens ferrule. Note that a configuration of each of the first ferrule 10, the second ferrule 20, and a connection unit 30 (the first lens plate 40, the relay plate 50, and the second lens plate 60) in the third embodiment is similar to that in the first embodiment (or the second embodiment). Also in the third embodiment, three of the first ferrule 10, the connection unit 30 (particularly, the relay plate 50), and the second ferrule 20 can be passively aligned with a simple configuration. Also in the third embodiment, three of a multi-core fiber 1, a single-core fiber 7, and an optical system that optically connects the multi-core fiber 1 and the single-core fiber 7 to each other can be passively aligned with a simple configuration.

Other

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

REFERENCE SIGNS LIST

1: Multi-core fiber;
3: Core;
7: Single-core fiber;
10: First ferrule;
11: Guide hole;
12: Fiber hole;
13: Connecting end face;
20: Second ferrule;

21: Guide hole;
22: Fiber hole;
23: Connecting end face;
25: Guide pin;
30: Connection unit;
31: Through hole;
40: First lens plate;
41: Through hole;
42: First end face;
421: First recessed part;
43: Second end face;
431: Second recessed part;
44: First optical system;
45: First end optical unit;
451: First end optical element;
46: First lens unit;
461: First lens;
50: Relay plate;
51: Through hole;
52: First end face;
521: First recessed part;
53: Second end face;
531: Second recessed part;
54: Optical path conversion optical system;
55: First optical unit;
551: First optical element;
56: Second optical unit;
561: Second optical element;
60: Second lens plate;
61: Through hole;
62: First end face;
621: First recessed part;
63: Second end face;
64: Second optical system;
65: Second lens unit;
651: Second lens;
100: Connector system.

The invention claimed is:

1. A connector system comprising:
a first ferrule that holds end parts of multi-core fibers;
a second ferrule that holds end parts of single-core fibers; and
an optical connection member that:
  is disposed between the first ferrule and the second ferrule, and
  comprises an optical system that optically connects respective cores of the multi-core fibers and the corresponding single-core fibers, wherein
one of the first ferrule and the second ferrule comprises a guide pin, and the other of the first ferrule and the second ferrule has a guide hole,
the first ferrule, the optical connection member, and the second ferrule are aligned by fitting the guide pin in the guide hole through a through hole of the optical connection member,
the optical connection member further comprises:
  a first lens plate disposed on an end face of the first ferrule;
  a second lens plate disposed on an end face of the second ferrule; and
  a relay plate disposed between the first lens plate and the second lens plate,
the first lens plate comprises first lenses corresponding to the multi-core fibers,
the second lens plate comprises second lenses corresponding to the single-core fibers,
the relay plate comprises:
  first optical elements corresponding to the first lenses; and
  second optical elements corresponding to the second lenses,
the relay plate propagates an optical signal between the first optical elements and the second optical elements,
the first optical elements face a corresponding first lens such that collimated light propagates between the respective first lenses and the corresponding first optical elements, and
the second optical elements face a corresponding second lens such that collimated light propagates between the respective second lenses and the corresponding second optical elements.

2. The connector system according to claim 1, wherein
the first lens plate comprises first end optical elements corresponding to the cores of the multi-core fibers, and
the first end optical elements have normal directions different from each other to spread an interval between optical paths formed between the first end optical elements and the first lenses further toward the relay plate.

3. The connector system according to claim 2, wherein all normal lines of flat surfaces constituting the first end optical elements are inclined with respect to a direction parallel to central axes of the multi-core fibers.

4. The connector system according to claim 1, wherein the second optical elements corresponding to the multi-core fibers are disposed along a direction perpendicular to a direction in which the multi-core fibers held by the first ferrule are aligned.

5. The connector system according to claim 1, wherein the collimated light propagating between the second lens and the second optical element is in a direction parallel to an axis direction of the guide pin.

6. An optical connection method comprising:
disposing an optical connection member between a first ferrule and a second ferrule, wherein the first ferrule holds end parts of multi-core fibers and the second ferrule holds end parts of single-core fibers;
aligning the first ferrule, the optical connection member, and the second ferrule by fitting a guide pin of one of the first ferrule and the second ferrule in a guide hole of the other of the first ferrule and the second ferrule through a through hole of the optical connection member; and
optically connecting respective cores of the multi-core fibers and the corresponding single-core fibers via an optical system of the optical connection member, wherein
the optical connection member comprises:
  a first lens plate disposed on an end face of the first ferrule;
  a second lens plate disposed on an end face of the second ferrule; and
  a relay plate disposed between the first lens plate and the second lens plate,
the first lens plate comprises first lenses corresponding to the multi-core fibers,
the second lens plate comprises second lenses corresponding to the single-core fibers,
the relay plate comprises:
  first optical elements corresponding to the first lenses; and
  second optical elements corresponding to the second lenses, the relay plate propagates an optical signal between the first optical elements and the second optical elements, the first optical elements face a corresponding first lens such that collimated light propagates between the respective first lenses and the corresponding first optical elements, and the second optical elements face a corresponding second lens such that collimated light propagates between the respective second lenses and the corresponding second optical elements.

7. An optical connection member comprising:

a first lens plate
  disposed on an end face of a first ferrule that holds end parts of multi-core fibers, and
  comprising first lenses corresponding to the multi-core fibers;

a second lens plate
  disposed on an end face of a second ferrule that holds end parts of single-core fibers, and
  comprising second lenses corresponding to the single-core fibers; and a relay plate
  disposed between the first lens plate and the second lens plate, and
  that propagates an optical signal between the first lenses and the second lenses, wherein a pair of through holes are formed in each of the first lens plate, the second lens plate, and the relay plate, the first lens plate, the second lens plate, and the relay plate are aligned with respect to the first ferrule and the second ferrule by fitting guide pins in the through holes, the relay plate comprises:
  first optical elements corresponding to the first lenses; and
  second optical elements corresponding to the second lenses, the relay plate propagates an optical signal between the first optical elements and the second optical elements, the first optical elements face a corresponding first lens such that collimated light propagates between the respective first lenses and the corresponding first optical elements, and the second optical elements face a corresponding second lens such that collimated light propagates between the respective second lenses and the corresponding second optical elements.

* * * * *